Oct. 10, 1961 H. KONIG 3,004,241

SELECTIVE CALL-RECEIVING DEVICE IN COMMUNICATION SYSTEMS

Filed June 5, 1959 2 Sheets-Sheet 1

United States Patent Office 3,004,241
Patented Oct. 10, 1961

3,004,241

SELECTIVE CALL-RECEIVING DEVICE IN COMMUNICATION SYSTEMS

Heinrich Konig, Zurich, Switzerland, assignor to Albiswerk Zurich A.G., Zurich, Switzerland, a corporation of Switzerland Filed June 5, 1959, Ser. No. 818,290
Claims priority, application Switzerland June 6, 1958
6 Claims. (Cl. 340—164)

My invention relates to a method for selectively calling one of a group of receivers by means of a signal-code of selector pulses whose respective durations or mutual time spacings serve as selection criteria, and to a device for receiving such coded call signals.

Known selective call methods in which the lengths of pulses or spaces determine the selection of one of several receiver stations, operate by first issuing a starting pulse of greater length than all following pulses of the code combination. The starting pulse places all receiver stations in ready condition. Then a call signal proper, composed of pulses and spaces of given individual length, is released in the transmitting station and simultaneously in all receiving stations. At the termination of the selecting operation, an acoustical or optical signal is issued only in the one receiving station whose own signal code coincides with that of the particular call received. For example, the call signal may comprise three selection criteria formed by three pulses of given respective lengths. After termination of the first code pulse, all of those receiving stations that are set for a different length of the first pulse, revert to inactive condition. This is repeated at the end of the second and third pulses so that after termination of the complete composite call signal, only the one receiver station remains in ready condition in which all pulse lengths of its own signal code coincide with those of the calling signal.

According to the known methods of this type, the transmission of the individual selection criteria occurs with intervals which may have any length within a limited period of time. This requires the receiving stations to be provided with auxiliary devices for the switching of those components that define the pulse lengths of the signal code assigned to that particular station. Each receiver station must also be provided with data storing devices which respond to occurrence of coincidence of the pulse length of each individual selection criterion. It is further necessary to provide means which disconnect the receiver by clearing the signal storing devices when the selection is interrupted.

It is an object of my invention to provide an improved selective call method which affords greatly simplifying the receiving stations by obviating the need for the above-mentioned accessory devices.

For this purpose, and in accordance with my invention, the end pulse of a selection criterion is simultaneously used as the starting pulse for the next following selection criterion, and the length of the selection pulses is made equal to, or smaller than, the step length between two selective pulse spacings. For transmitting the call signal, the normally-on or the normally-off principle can be employed, the selection pulses in the first case being formed by current pulses and in the latter case by current pauses.

According to another feature of the invention, a device for receiving selector calls issued by the above-described method, comprises pulse delaying stages equal in number to that of the selection criteria being used, the timing intervals of these stages being characteristic of each particular receiver. The device according to the invention is further provided with a signal transmitter stage, and the time-delay stages are interconnected in cascade through respective coincidence gates which are controlled by the selector pulses, and which, conjointly with the first pulse delaying stage, operate in such a manner that the next following pulse-delay stages and the signal transmitter stage are supplied with an input pulse only if the output pulse of each preceding delay stage coincides with a selector pulse.

The invention will be further described and explained with reference to the drawing showing, by way of example, an embodiment of a receiving device for response to a calling signal composed of two selection criteria, the signal being transmitted by radio, and the device operating on the continuous-current (normally-on) principle.

Figure 1:
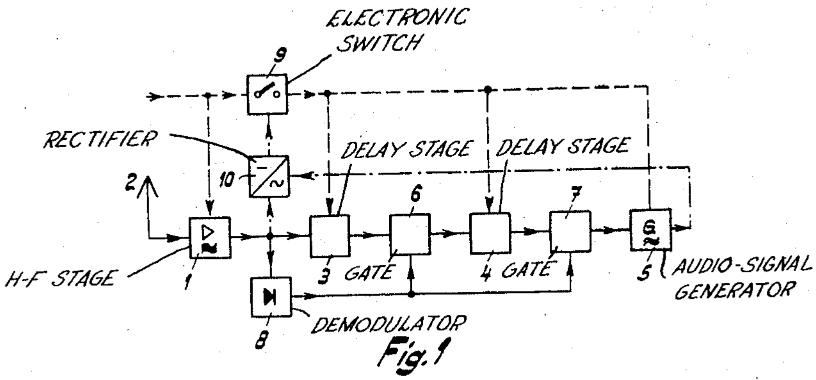
FIG. 1 is a schematic block diagram of the receiving station.

According to the block diagram of FIG. 1, the receiver comprises a high-frequency stage 1 for amplifying the call signal received by an antenna 2 in form of a pulse-modulated high-frequency signal on a carrier frequency of 30,000 c.p.s., for example. The receiving device further comprises two pulse delaying stages 3, 4 and a signal transmitter stage 5 connected in cascade through coincidence gating devices 6 and 7. The incoming selector pulses control the first pulse delaying stage 3 and, through a demodulator 8, the coincidence gates 6 and 7 in such a manner that a second pulse delay stage 4 and the signal generating stage 5 are supplied with an input signal only if the output pulse of each preceding pulse delay stage coincides with the selector pulse. The signal generator stage 5 comprises a tone-frequency oscillator and an electroacoustic transducer for producing an audible call signal.

In FIG. 1, the signal leads are shown by full lines, the power feeder leads by broken lines, and the control leads by dot-and-dash lines. The high-frequency stage 1 is energized directly from the current source, whereas the other stages are supplied with energizing current through an electronic switch 9 which is closed by the starting pulse of the high-frequency call signal rectified in a rectifier 10. Once a starting signal is received, the electronic switch 9 is kept closed during the current pauses within each selecting operation. During the operating period of the signal generator stage 5, a control voltage, maintaining the electronic switch 9 closed, is derived from that generator stage. Consequently, in the idle condition of the receiving device, only the high-frequency stage 1 is energized by current, whereas all other stages are switched on only when receiving a call signal.

Figure 2:
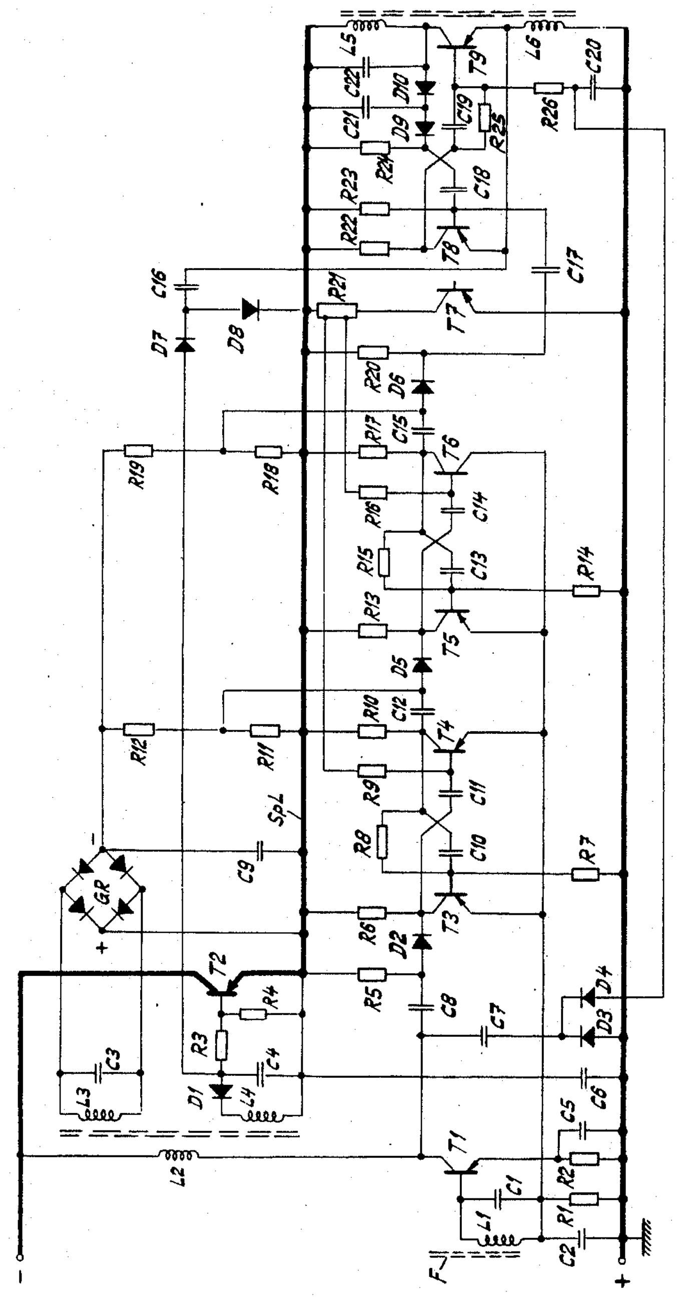
FIG. 2 shows the complete circuit diagram of the receiving station.

Details of the receiving device will now be described with reference to FIG. 2.

The high-frequency stage, comprising a transistor T1, operates in class B operation when the receiving device is idle, but converts to class A operation after the other stages are switched on. Consequently, the power requirements of the receiver in idle condition are virtually zero. Used as the antenna is a ferrite rod F which carries the coil L1 of a tank circuit L1, C1 tuned to the carrier frequency (for example 30,000 c.p.s.) of the calling signal. The chosen quality factor of the tank circuit is relatively low ($Q=1 \ldots 2$) for keeping the transmission of the high-frequency pulses as undistorted as possible. Two resistors R1 and R2 serve for stabilizing the emitter-to-base current of transistor T1. The amplified high-frequency signal is taken from the collector of transistor T1 and is supplied through a capacitor C8 and a diode D2 to the first pulse delaying stage. This stage and the second pulse delay stage, are formed by respective monostable multivibrators of the same design, comprising transistors T3, T4 and T5, T6. In idle condition, the transistors T4 and T6 are in conductive condition. The resistance capacitance members R9, C11 and R16, C14, determine the time constant of the respective pulse-delaying operations, the pair of capacitance values for capacitors C11 and C14 being different in each receiver from those of the other receivers of a group. The emitters of transistors T3 to T6 are all grounded through the common emitter resistor R1. As a result, a positive bias voltage is applied through resistors R7 and R14 to the bases of respective transistors T3 and T5 to prevent self-starting of the multivibrators.

Fundamentally, the time constant of the pulse delay depends upon the leakage current of the transistor T4 or T6, this current being dependent upon temperature. For temperature compensation, a voltage is introduced through the resistor R9, R16 which follows the same law of temperature-responsive change as the leakage current. This renders the time constant independent of temperature. The compensating voltage is tapped from a potentiometer resistor R21 connected in the collector circuit of a transistor T7 of the same type as the transistors T4 and T6.

The signal generator stage also consists of a monostable multivibrator with transistors T8 and T9 in which, however, the amplifier stage (T9), conducting no current in the idle condition, is designed as an audio-frequency oscillator feed-back connected in itself. The control voltage for the other amplifier (T8) is obtained by rectifying the audio-frequency voltage. The load impedance of the oscillator-transistor T9 is formed by a tank circuit composed of an inductance coil L5 and a capacitor C22. Another capacitor C21 is connected parallel to capacitor C22 through a diode D10. A resistor R24 serves for discharging the capacitor C21, and a diode D9 is inserted for de-coupling the capacitor C21 from the base of transistor T8 relative to positive pulses. Inductively linked with coil L5 is a feed-back coil L6. The feed-back transformer L5, L6 constitutes the excitation system of an electroacoustic transducer for producing an audible signal whose frequency may be 3000 c.p.s., for example. To prevent the audio-frequency oscillator from building up oscillations due to the transistor leakage current, the base of transistor T9 is supplied with positive bias voltage through a resistor R26. The bias voltage is obtained from the high-frequency signal by rectification. Used as rectifier for this purpose is a voltage-doubling connection formed by diodes D3, D4 and capacitors C7, C20.

The output of each pulse delay stage is connected with the next following stage by a coincidence gating device. The coincidence gates consist of the series connection of a capacitor C12 or C15 with a diode D5 or D6 biased in the blocking direction. The bias of diodes D5 and D6 is so chosen that the output pulse of each multivibrator is transmitted to the input of the next following stage only if a selector pulse simultaneously controls the appertaining coincidence gate in the bias-reducing sense. Since the transmission of the selector pulses is effected on the continuous-current (normally-on) principle so that the selector signals are formed by the current pauses, the bias voltage is derived from the high-frequency signal and hence vanishes when a selecting signal (pause) is being received. The high-frequency signal is rectified by a rectifier GR which is transformer-coupled with the high-frequency stage, the coupling being effected by a coil L3 which, together with a capacitor C3, forms a tank circuit tuned to the high frequency. The bias voltage is taken off at a circuit point between resistors R11 and R12 on the one hand, and at a circuit point between resistors R18 and R19 on the other hand.

The resistors R11 and R18 serve to discharge the capacitors C12 and C15. The resistors R12 and R19 serve to mutually decouple the coincidence gates.

The receiving device is supplied with current from a single battery (for example 2.6 v.). With the exception of the high frequency stage directly connected to the feed buses, all stages of the device are energized through an electronic switch comprising a transistor T2 in grounded-collector connection. The normally-open electronic switch is closed at the beginning of a calling signal which makes the transistor T2 conducting. The base-emitter voltage for controlling the transistor T2 is obtained by rectifying the high-frequency signal at a diode D1 which is likewise transformer-coupled with the high-frequency stage. A capacitor C4 serves for smoothing the rectified voltage and also as a storer for maintaining the electronic switch in closed condition during the current pauses of the signal. A resistor R4 reduces the leakage current of transistor T2. The electronic switch is kept in closed condition beyond the duration of the selecting operation during the active period of the signal generator stage, this being effected by a control voltage derived from the signal generator stage. This control voltage is obtained by rectifying the audio-frequency voltage taken from the emitter of transistor T8 by means of the voltage-doubling connection composed of the diodes D7, D8 and the capacitors C16, C4.

An example of types and parameter values of the circuit components shown in FIG. 2 and used in a tested embodiment of the device are listed in the following table, it being understood that these data may be changed in accordance with the particular requirements or desiderata of any particular application.

| | |
|---|---|
| T1 | OC44. |
| T2, T9 | OC76. |
| T3 . . . T8 | OC70. |
| D1 . . . D10 | OA85. |
| GR | 4xDN 34*a*. |
| L1 | 324 turns, 7 mh. |
| L2 | 250 turns. |
| L3 | 77 turns. |
| L4 | 420 turns. |
| L5 | 360 turns. |
| L6 | 120 turns. |
| R1 | 220 ohm. |
| R2 | 330 ohm. |
| R3 | 270 ohm. |
| R4 | 3.3K ohm. |
| R5 | 100K ohm. |
| R6, R13 | 2.2K ohm. |
| R7, R14 | 10K ohm. |
| R8, R15 | 10K ohm. |
| R9, R16 | 27K ohm. |
| R10, R17 | 2.2K ohm. |
| R11, R18 | 22K ohm. |
| R12, R19 | 6.8K ohm. |
| R20 | 6.8K ohm. |
| R21 | 150 ohm. |
| R22 | 1K ohm. |
| R23 | 15K ohm. |
| R24 | 15K ohm. |
| R25 | 12K ohm. |
| R26 | 100 ohm. |
| C1 | 4 *n*f. |
| C2 | 10 $\mu$f. |
| C3 | 2 *n*f. |
| C4 | 2 $\mu$f. |
| C5 | 10 $\mu$f. |
| C6 | 0.5 $\mu$f. |
| C7 | 2 *n*f. |
| C8 | 2 *n*f. |
| C9 | 3 *n*f. |
| C10, C13 | 5 *n*f. |
| C12 | 1.5 *n*f. |
| C15 | 2.1 *n*f. |
| C16 | 0.1 $\mu$f. |
| C17 | 50 *n*f. |
| C18 | 8 $\mu$f. |
| C19 | 33 *n*f. |
| C20 | 10 *n*f. |
| C21 | 0.25 $\mu$f. |
| C22 | 0.5 $\mu$f. |

The performance of the above-described receiving device will be explained with reference to the pulse diagrams (*a*) to (*e*) in FIG. 3. FIG. 3*a* illustrates the pulse sequence of a complete call signal used in the call-signal transmitter for modulating the carrier frequency. The call signal commences with the starting pulse AI when the continuous current is switched on. The starting pulse is followed by the first selector pulse 1.WI consisting of a current gap (pause) of the duration $\tau$ (for example 0.3 millisecond). The second and third selector pulses 2.WI and 3.WI respectively, follow the first pulse after given intervals whose durations constitute respective selection criteria. The second selector pulse 2.WI is simultaneously the end portion of the first selecting criterion and the starting portion of the second selecting criterion.

In the present example, the second and the third selecting pulses may occupy any one of six different positions relative to the preceding selecting pulse, these six possibilities being indicated by vertical dot-and-dash lines (pulse centers) numbered from 1 to 6. Accordingly, six selective pulse spacings are available for each selecting criterion so that, by combination, 36 different call signals can be made available. The step length between two selector-pulse spacings is equal to the length of the selecting pulse. The end of the pulse sequence is formed by a terminating pulse SI.

The starting pulse AI, rectified in the receiving device by the diode D1, charges the capacitor C4. As a result, the base potential of transistor T2 is reduced, thus turning the transistor T2 on. This closes the feed-current circuit for the receiver stages that are not energized in the idle condition of the receiving device. The voltage at the feeder line S*p*L (FIG. 2) is in accordance with the diagram shown in FIG. 3*b*.

Figure 3:
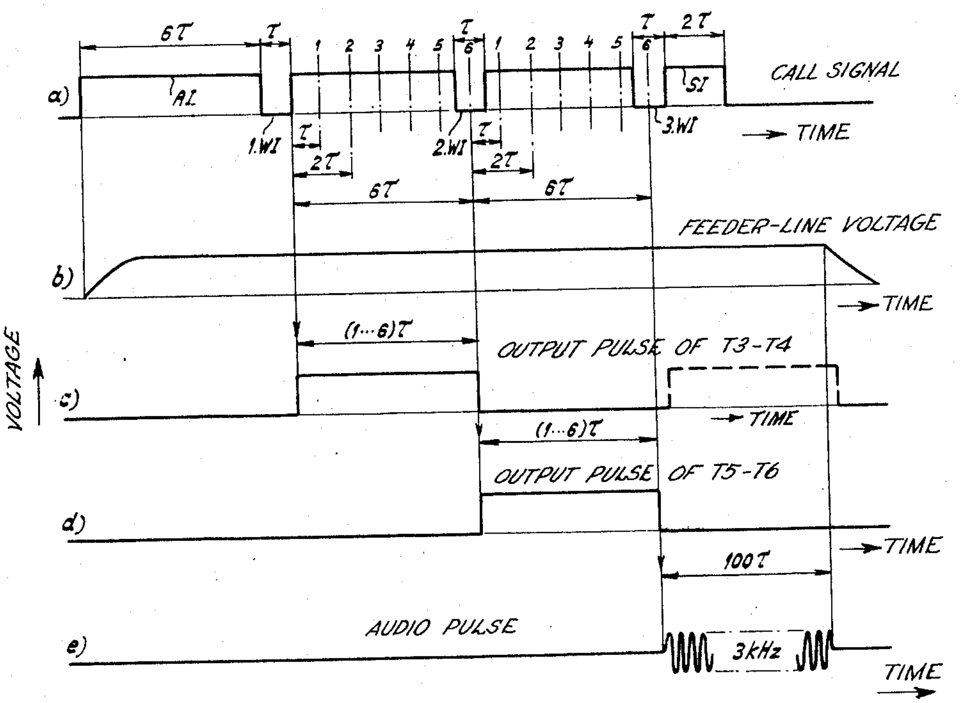
FIG. 3 is a graph showing pulse diagrams for explaining the functioning of the individual stages of the receiver.

Assume that the time constants of the two pulse delay stages are adapted to make the receiving device, namely its siganl generator stage, respond to the particular call signal according to the pulse diagram of FIG. 3*a*, in which the largest selectable pulse spacing is chosen for the two selecting criteria. At the end of the first selecting pulse 1.WI, the first multi-vibrator (T3, T4) is triggered due to the fact that the transistor T3 is turned on by the pulse peak which is active on the collector and is derived from the ascending flank of the first full positive high-frequency wave of the continuous current now again flowing. After elapse of the given interval of time $6\tau$, the multi-vibrator reverts back to the stable starting condition (FIG. 3*c*). This causes a positive pulse peak to occur at capacitor C12 and trigger the second multi-vibrator (T5, T6). However, the just-mentioned pulse peak, appearing as the output signal of the first pulse delay stage, is transmitted to the input of the second pulse delay stage only if this output signal occurs within an interval of time during which a second selecting pulse 2.WI is effective. The continuous current flowing between two selecting pulses produces at diode D5 a bias voltage in the blocking direction which is chosen so large that the amplitude of the output signal is not sufficient to control the diode D5 for conductance in the forward direction. During the active duration of the second selecting pulse 2.WI, the continuous current is interrupted and the above-mentioned bias voltage vanishes so that the output signal of the first delay stage occurring within this time interval can release the next following pulse delay stage. Similar conditions obtain relative to the transfer of the output pulse (FIG. 3*d*) from the second pulse delay stage to the signal generator stage. That is, the signal generator stage responds only if, like in the preceding example, the pulse peak produced when the second multi-vibrator (FIG. 3) reverts to stable inactive condition, coincides in time with the third selecting pulse.

The multi-vibrator (T8, T9) of the signal generator stage, after responding, remains in its active condition, for example for an interval of 30 millisecond$=100\tau$. During this interval, the audio-frequency oscillator is in oscillation and produces the acoustic signal (FIG. 3*e*).

When the continuous current ultimately vanishes a short time ($2\tau$) after termination of the third selecting pulse 3.WI, the calling signal is terminated. At this moment the electronic switch T2 of the receiving device in all receiver stations, with the exception of the one selected, is opened. In the selected receiver station, the control voltage derived from the now oscillating audio-frequency generator keeps the electronic switch in closed condition until the multi-vibrator of the signal generator stage reverts to the starting condition. The repeated response of the first pulse delay stage at the end of the third selecting pulse (FIG. 3*c*) has no disturbing effect upon the above-described operation.

The invention permits of numerous changes and modifications, in comparison with the above-described embodiment of the receiving device built and tested, with respect to the design of the individual stages and the number of stages employed. For example, the invention may be applied for more than two selecting criteria and for more than six (for example 10) selectable impulse spacings of a selecting criterion, thus permitting an increase in the number of receiving stations that can be reached by call signals from a single transmitter. Each additional selecting criterion merely requires the addition of another pulse delay stage and another coincidence gate. The permissible enlargement in this sense is limited only by the attainable tolerance of the pulse lengths and pulse spacings. This limitation, however, vanishes if the step lengths of the selective pulse spacings are not equal among themselves as in the above-described example, but are in accordance with a geometric series.

Particular advantages of the receiving device according to the invention are its extremely small space requirements and slight current consumption. The above-described tested device, for example, occupies no more space than a cigarette package (10-pack). The invention, therefore, is particularly suitable for personnel locating systems with portable or pocket receivers. Experience has also shown that the receiving device according to the invention is virtually insensitive to spurious signals.

The duration of each call can be prolonged by periodically repeating the call signal. This causes the above-described functioning sequence in the receiving device to repeat itself. By suitable choice of the repetition frequency (for example 10 c.p.s.), the audibility of the acoustic signal over noises, in comparison with a continuous tone, can be greatly improved without increase in tone intensity.

I claim:

1. A receiving device selectively callable by a coded call signal composed of a starting pulse, followed by a given number of successive code pulses, with the time spacing between each pulse and the next pulse being determined according to the code of the called receiving device and constituting the selection criteria, which comprises a signal receiving stage, pulse delay stages equal in number to that of the selection criteria of the call signal, said delay stages having respective timing periods which, in totality, are distinctive of the particular call signal to which the receiving device will respond, a local-signal generating stage for producing a local signal under control by a call signal received, a first one of said pulse delay stages being connected to said signal receiving stage for response to the starting pulse, coincidence gates, said pulse delay stages being connected in cascade with each other through respective ones of said coincidence gates, the last pulse delay stage being connected to said signal generator stage through another one of said coincidence gates, whereby a call signal being received by said receiving stage controls the first pulse delay stage, and means connecting the output of the signal receiving stage to said coincidence gates for passing the output pulse from one pulse delay stage through a coincidence gate to each next pulse delay stage and to said signal generating stage only when the output pulse of each preceding pulse delay stage coincides with one of said selection criteria.

2. In a selectively callable receiving device, according to claim 1, all of said stages having respective electronic members, feeder current supply means connected with said receiving stage for energizing it during receptive condition of the device, a normally open electronic switch connected between said current supply means and all of said other stages, said electronic switch having a switch control circuit connected with said receiving stage for closing said switch in response to reception of said starting pulse, means connected with said switch control circuit for keeping said switch closed during current pauses of the calling signal, and voltage supply means connecting said signal generator stage with said switch control circuit for keeping said switch closed during the operating period of said signal generator stage.

3. In a selectively callable receiving device according to claim 1, each of said pulse delay stages comprising a monostable multivibrator, each of said coincidence gates comprising a capacitor and a diode connected in series with each other between the output of one of said multivibrators and the input of the next following one of said stages, and bias voltage means connected with each of said diodes for applying thereto a bias voltage in the blocking sense which is reduced to a value required for passing the output pulse of said one multivibrator to said next following stage only when a code pulse is applied simultaneously with said output pulse to said coincidence gate in the diode-bias reducing sense.

4. In a selectively callable receiving device according to claim 1, said signal generator stage consisting of a monostable multivibrator having two amplifier stages of which one is normally de-energized, said one amplifying stage consisting of an internally feedback-connected audio-frequency oscillator.

5. A selectively callable receiving device according to claim 4, comprising rectifier means connected to said audio-frequency oscillator, and said other amplifying stage having a control circuit connected to said rectifier means for deriving control voltage from said oscillator.

6. In a selectively callable receiving device according to claim 5, said one amplifying stage having a load impedance consisting of an oscillatory tank circuit, a capacitor, and a rectifier connecting said capacitor with said tank circuit in parallel relation thereto.

References Cited in the file of this patent

UNITED STATES PATENTS

| | | |
|---|---|---|
| 2,538,615 | Carbrey | Jan. 16, 1951 |
| 2,549,422 | Carbrey | Apr. 17, 1951 |